(12) United States Patent
Banerjee (10) Patent No.: US 11,856,276 B2
(45) Date of Patent: Dec. 26, 2023

(54) SCALABLE ARCHITECTURE FOR AUTOMATIC GENERATION OF CONTENT DISTRIBUTION IMAGES

(71) Applicant: Oracle International Corporation, Redwood Shores, CA (US)

(72) Inventor: Abhik Banerjee, Milpitas, CA (US)

(73) Assignee: Oracle International Corporation, Redwood Shores (CA)

( * ) Notice: Subject to any disclaimer, the term of this patent is extended or adjusted under 35 U.S.C. 154(b) by 382 days.

(21) Appl. No.: 17/017,486

(22) Filed: Sep. 10, 2020

(65) Prior Publication Data

US 2021/0081719 A1    Mar. 18, 2021

Related U.S. Application Data

(60) Provisional application No. 62/900,400, filed on Sep. 13, 2019.

(51) Int. Cl.
*H04N 21/854*    (2011.01)
*G06F 16/903*    (2019.01)
(Continued)

(52) U.S. Cl.
CPC ..... *H04N 21/854* (2013.01); *G06F 16/90344* (2019.01); *G06F 18/2148* (2023.01);
(Continued)

(58) Field of Classification Search
CPC ............... G06K 9/6259; G06K 9/6257; G06F 16/90344; G06N 3/0454; G06N 3/08
See application file for complete search history.

(56) References Cited

U.S. PATENT DOCUMENTS 10,108,902 B1 * 10/2018 Lockett ................ G06N 3/0445
2017/0064363 A1 * 3/2017 Wexler ............... H04N 5/23218
(Continued)

FOREIGN PATENT DOCUMENTS

WO    2019044064 A1    3/2019

OTHER PUBLICATIONS

Li et al., "Object-driven Text-to-Image Synthesis via Adversarial Training", Conference on Computer Vision and Pattern Recognition, Jun. 15, 2019, pp. 12166-12174.
(Continued)

*Primary Examiner* — Qun Shen
(74) *Attorney, Agent, or Firm* — Mughal Gaudry & Franklin PC (57) ABSTRACT

Methods and systems are disclosed for automatic generation of content distribution images that include receiving user input corresponding to a content-distribution operation. The user input may be parsed to identify keywords. Image data corresponding to the keywords can be identified. Image-processing operations may be executed on the image data. Executing a generative adversarial network on the processed image data, which includes: executing a first neural network on the processed-image data to generate first images that correspond to the keywords, the first images generated based on a likelihood that each image of the first images would not be detected as having been generated by the first neural network. A user interface can display the first images with second images that include images that were previously part of content-distribution operations or images that were designated by an entity as being available for content-distribution operations.

17 Claims, 4 Drawing Sheets

(51) Int. Cl.
  *G06N 3/08* (2023.01)
  *G06F 18/214* (2023.01)
  *G06N 3/045* (2023.01)

(52) U.S. Cl.
  CPC ......... G06F 18/2155 (2023.01); G06N 3/045 (2023.01); G06N 3/08 (2013.01)

(56) References Cited

U.S. PATENT DOCUMENTS

| | | | |
|---|---|---|---|
| 2018/0204111 A1* | 7/2018 | Zadeh | G06V 10/764 |
| 2019/0012568 A1* | 1/2019 | Kumar | G06N 5/02 |
| 2019/0251401 A1 | 8/2019 | Shechtman et al. | |
| 2019/0266442 A1* | 8/2019 | Malur Srinivasan | G06V 10/764 |
| 2020/0021873 A1* | 1/2020 | Swaminathan | G06N 3/08 |
| 2020/0151521 A1* | 5/2020 | Almazán | G06F 18/2431 |

OTHER PUBLICATIONS

Lin et al., "Microsoft COCO: Common Objects in Context", Advances in Databases and Information Systems, Springer International Publishing, Dec. 31, 2014, pp. 740-755.

Reed et al., "Generative Adversarial Text to Image Synthesis", $33^{rd}$ International Conference on Machine Learning, vol. 48, Retrieved from the Internet::http://proceedings.mlr.press/v48/reed16.html, May 17, 2016, 10 pages.

Reed et al., "Learning What and Where to Draw", Advances in Neural Information Processing Systems, $^{th}$ 29th Conference on Neural Information Processing Systems (NIPS 2016), Barcelona, Spain carXiv:1610.02454v1, Oct. 8, 2016, 9 pages.

Zhang et al., "StackGAN: Text to Photo-realistic Image Synthesis with Stacked Generative Adversarial Networks", Arxiv.Org, Cornell University Library, Dec. 10, 2016, 15 pages.

International Application No. PCT/US2020/050406, International Search Report and Written Opinion, dated Nov. 26, 2020, 16 pages.

European Application No. EP20780841.1, "Office Action", dated Nov. 8, 2022, 12 pages.

Nam, et al., "Text-Adaptive Generative Adversarial Networks: Manipulating Images with Natural Language", NIPS'18: Proceedings of the 32nd International Conference on Neural Information Processing Systems, Oct. 29, 2018, 10 pages.

Zhang, et al., "StackGAN: Text to Photo-Realistic Image Synthesis with Stacked Generative Adversarial Networks", Available Online at: https://arxiv.org/pdf/1612.03242.pdf, Aug. 5, 2017, 9 pages.

* cited by examiner

SCALABLE ARCHITECTURE FOR AUTOMATIC GENERATION OF CONTENT DISTRIBUTION IMAGES

CROSS-REFERENCES TO RELATED APPLICATIONS

This application claims the benefit of U.S. Provisional Application No. 62/900,400, filed Sep. 13, 2019, entitled "SCALABLE ARCHITECTURE FOR AUTOMATIC GENERATION OF CONTENT DISTRIBUTION IMAGES" the entire contents of which are incorporated herein by reference for all purposes.

FIELD

The present invention relates generally to the automatic generating content for content-distribution operations, and more particularly to scalable architecture utilizing neural networks for content-distribution operations.

BACKGROUND

Generating the content for content-distribution operations can be resource intensive and time consuming. Often the goal of content-distribution operations is to distribute particular content to a particular set of devices within a particular, relevant time interval. Companies may employ teams of photographers, designers, artists, etc. to obtain the images for the operation, modify those images based on one or more criteria, convert the modified images into a format suitable for transmission or display, and transmit the formatted images to the particular set of devices. Companies will frequently spend weeks designing a single content distribution at considerable resource expenditure. Furthermore, by the time distribution operation commences, enough time may have passed that the generated content may no longer be relevant to the particular set of devices that receive them. Thus, systems and methods are needed to reduce the resource requirements of content-distribution operations.

SUMMARY

A method is disclosed for the automatic generation of images of content-distribution operations. The method comprising: receiving user input corresponding to a content-distribution operation; parsing the user input to identify one or more keywords associated with the content-distribution operation; receiving, from one or more databases, image data that corresponds to the one or more keywords associated with the content-distribution operation; executing one or more image-processing operations on the image data to derive processed image data, the image-processing operations providing an indication of a particular location within the image that corresponds to the one or more keywords; executing a generative adversarial network on the processed image data to generate one or more images for the content-distribution operation, wherein executing a generative adversarial network includes: executing a first neural network on the processed image data, the first neural network generating a first set of images that correspond to the one or more keywords, wherein the first set of images were generated based at least in part on a likelihood that each image of the first set of images would not be detected as having been generated by the first neural network; displaying, via first user interface, the first set of images with a second set of images, the second set of images including images that were previously part of one or more content-distribution operations or images that were designated by an entity associated with the content-distribution operation to be available for content-distribution operations.

Another aspect of the present disclosure includes a system comprising one or more processors and a non-transitory computer-readable media that includes instructions that when executed by the one or more processors, cause the one or more processors to perform methods described above.

Other aspects of the present disclosure include a non-transitory computer-readable media that includes instructions that when executed by one or more processors, cause the one or more processors to perform the methods described above.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

A scalable architecture can be defined for generating content and content-distribution operations using artificial intelligence. A generative adversarial network may be trained at runtime to generate particular images for content-distribution operations. For instance, user input can be parsed to determine one or more keywords that correspond to an intended context of the content-distribution operation. The one or more keywords may represent, for example, one or more subjects of the content (e.g., such as person), characteristics of the subject (such as the race, gender, height, weight, etc. of the person), one or more objects to represented in the content, a setting (e.g., such as a location), or the like.

In some instances, the generative adversarial network may not be trained to generate images of every possible keyword or combination of keywords. In those instances, the one or more keywords may be used generate image data (e.g., from previous content-distribution operations and/or a database of labeled images) that can be used to train the generator neural network of the generative adversarial network at runtime. The generative adversarial network may then generate images corresponding to any keyword or combination of keywords on demand.

The discriminator neural network of the generative adversarial network may be trained after the generator neural network. Training the discriminator neural network can include generating images using the generator neural network and passing them to the discriminator neural network along with other images such as images from the image data. The discriminator neural network may generate predictions for each image that indicate whether the image was generated by the generator neural network. The predictions can be passed back to the generator neural network. The generator neural network uses the predictions from the discriminator neural network to improve image generation to generate images that are more likely to be labeled as real images by the discriminator neural network. Thus, the goal of the generator neural network is to trick the discriminator neural network into predicting a false negative (e.g., predicting that an image was not generated by the generator neural network even though the image actually was generated by the generator neural network).

After the generator neural network and the discriminator neural network are trained, the generator neural network may be executed using the one or more keywords to generate images for a content-distribution campaign. In some instances, the discriminator neural network may continue to generate predictions that may be used by the generator neural network to further refine image generation. In these instances, the prediction may also be used to filter the images generated by the generator neural network by, for example, removing those images that the discriminator correctly predicts as being generated by the generator neural network (e.g., the images do not appear as real images). The generated images (or remaining filtered images) can be transmitted to one or more client devices (e.g., devices associated with an entity that requested the generate images), a content distribution server (e.g., such as a webhost or the like), or one or more user devices (e.g., devices associated with users targeted by the one or more client devices) as part of the content-distribution campaign.

In some instances, the user input defining a content-distribution campaign can include natural language text, text commands, or pre-selected options. The input may describe the content to be distributed and/or the mechanism of the distribution (e.g., the particular devices that are to receive the content, communication protocols to be used in transmitted the content, format of the content, or the like). The user input may be processed to determine the one or more keywords. In some instances, natural language text or textual commands can be processed using a rule system. The rule system may include a hierarchy of rules, which when applied to the text, assign words or phrases to categories. The application of each rule may generate a class identifier that characterizes the word or phrase as corresponding to a particular category.

In some instances, the categories may be hierarchical such that if application of the rules characterizes a word as corresponding to two or more categories, the more specific category or the higher priority category may be assigned to the word. For instance, a first rule may identify phrases that refer to a first category of "modes of transportation", a second rule may identify phrases that refer to a second category of "cars", and a third rule may identify phrases that refer to a third category of "sedans". Although input text that refers to a sedan would trigger the application of all three rules, the third rule, being the most specific, would be applied. As a result, the keyword "sedan" would be selected as the keyword for the phrase.

In some instances, a machine-learning model may be used to identify the keywords of the input. The machine-learning model may be trained using training data derived from a set of previous content-distribution operations, open source databases, public databases, and/or from manufactured data (e.g., data generated for the purpose of training a machine-learning model). A set of features (e.g., words or phrases) from the training data can be extracted. The set of features can then be passed as input into the machine-learning model. The machine-learning model may be trained using unsupervised learning, semi-supervised learning, or supervised learning. Once trained, the machine-learning model may receive input text and output one or more keywords. In some instances, the machine-learning model may also output a confidence for each keyword of the one or more keywords that indicates a probability that the keyword corresponds to the input text.

For example, the set of previous content-distribution operations may be used identify a set of input text to train the machine-learning model. The machine-learning model is trained using supervised learning, each input text would be associated with a label (e.g., a keyword that would result from analysis of the input text). The machine-learning model may use the set of input text to determine what words and/or phrases correspond to particular category. During supervised learning, the machine-learning model may compare the output generated by the model (e.g., a predicted keyword) to label associated with the input text to adjust internal process of the machine-learning model and improve the accuracy of subsequent prediction. During unsupervised learning, the machine-learning model may extract features from each input text of the set of input text. The machine-learning model may then use a cluster analysis, for example, to identify relationships between related input text (e.g., associated with a same keyword or keywords) in the set of input text based on the extract features. Once trained, the machine-learning model may execute using the input for the particular content-distribution operation to categories the words and phrases of the input.

One or more keywords may be extracted from the categorized input. The one or more keywords may correspond to words or phrases within the input that may be representative of the context of the content distribution operations. Alternatively, the one or more keywords may correspond to a category assigned to a word or phrase. In some instances, a confidence value that is assigned to each input text that indicates a likelihood that the keyword was correctly selected for the input text. A threshold value may be used to discard keywords associated with confidence values that fall below the threshold to prevent the one or more keywords from representing an improper context of the content-distribution operation.

The one or more keywords can be used to obtain image data for input into a generative adversarial network. A query may be generated using the one or more keywords. The query may execute to obtain the image data from one or more databases and/or external networks. The image data may correspond to the one or more keywords and be associated with a context of the content-distribution operation. In some instances, one or more queries may be executed to obtain the image data from one or more databases and/or external networks in an iterative process. For instance, if a first query to a first database does not return image data that corresponds to the one or more keywords, a second query may be generated and executed on another database. The process may continue with each successive query executing on a different database or external network. If none of the databases or networks returns image data that corresponds to the one or more keywords, a final query may be generated and executed to obtain the image data from open source databases, public databases, or the Internet.

In some instances, the image data may be processed prior to being input into the generative adversarial network. For instance, one or more first keywords may correspond to cars and trucks and one or more second keywords may indicate that a background of the car or truck is to be an indoor environment. The retrieved image data may include images of cars and trucks in various indoor and outdoor environment. If the image data that corresponds to the cars and trucks in an indoor environments exceeds threshold (e.g., a particular quantity of images and/or a particular volume of data), then the image data corresponding to cars or trucks in outdoor environment may not be used.

If image data that corresponds to cars and trucks in an indoor environment does not exceed the threshold, then the image data corresponding to cars or trucks in an outdoor environment may processed to enable use of the data while conforming to the one or more first keywords and the one or more second keywords. For instance, the image data may be processed by generating an indication (e.g., such as a label or the like) as to the portions of each image that corresponds to the one or more first keywords and/or the one or more second keywords (or the portions of the image data that does not correspond to the one or more first keywords or the one or more second keywords). In some instances, the portions of the images that correspond to a keyword of the one or more first keywords and the one or more second keywords may be extracted from the portions of the images that do not correspond to a keyword of the one or more first keywords and the one or more second keywords. By generating the indication as to the portions images that are relevant (or portions that are not relevant), the generative adversarial network may be properly trained.

Image processing may include one or more operations that may be applied to modify the image data to better train the generative adversarial network. The one or more operations may be executed in any particular order. Image processing can include using object detection to label a portion of one or more objects of the image and in particular the one or more objects that correspond to the one or more keywords. In some instances, object detection/labeling may be performed by a neural network such as a convolutional neural network (CNN), region-CNN, fast-CNN, you-only-look-once (YOLO), or the like. Once the objects of the images are labeled, the image may be further processed by, for example, reducing the size of the image by removing portions of the image that do not correspond to the one or more keywords.

The modified image data may be passed as input into the generator network of the generative adversarial network. The generator network may be neural network (e.g., a convolutional, de-convolutional neural network, or the like). The generator network uses a transform function via a set of layers to derive a first set of images from the input image data. The first set of images may correspond to the one or more keywords (e.g., the context of the content distribution campaign) and be in a format suitable for distribution as part of the content distribution campaign. The first set of images may be passed to a discriminator network for evaluation.

The discriminator network may generate a prediction for each image of the first set of images that indicates whether the image was generated by the generator network or a real image. The discriminator network may transmit the prediction back to the generator network to facilitate further training of the generator network (e.g., backward propagation learning). In some instances, each image generated by the generator network may be accepted or rejected by a user before or after being passed to the discriminator network. For instance, each image may labeled as accepted or rejected. In some instances, the images and the corresponding labels may be passed to the generator network as a second layer of back propagation learning. In those instances, the label may be used to further refine image generation.

The prediction assigned to each image may be used to determine which images are to be included in the content distribution campaign and which images may be discarded (or used for further training of the generative adversarial network). For instance, content distribution campaign may include a second set of images that is a subset of the first set of images. The second set of images may include images from the first set of images that have been assigned a prediction from the discriminator network indicating the images were not generated by the generator network. The second set of images may then be transmitted according to the content distribution campaign to one or more client devices. Alternatively or additionally, in some instances, the content-distribution operation may include physical representations of the images of the second set of images. For instances, the images may be printed and sent to one or more recipients via postal mail or otherwise distributed.

Figure 1:
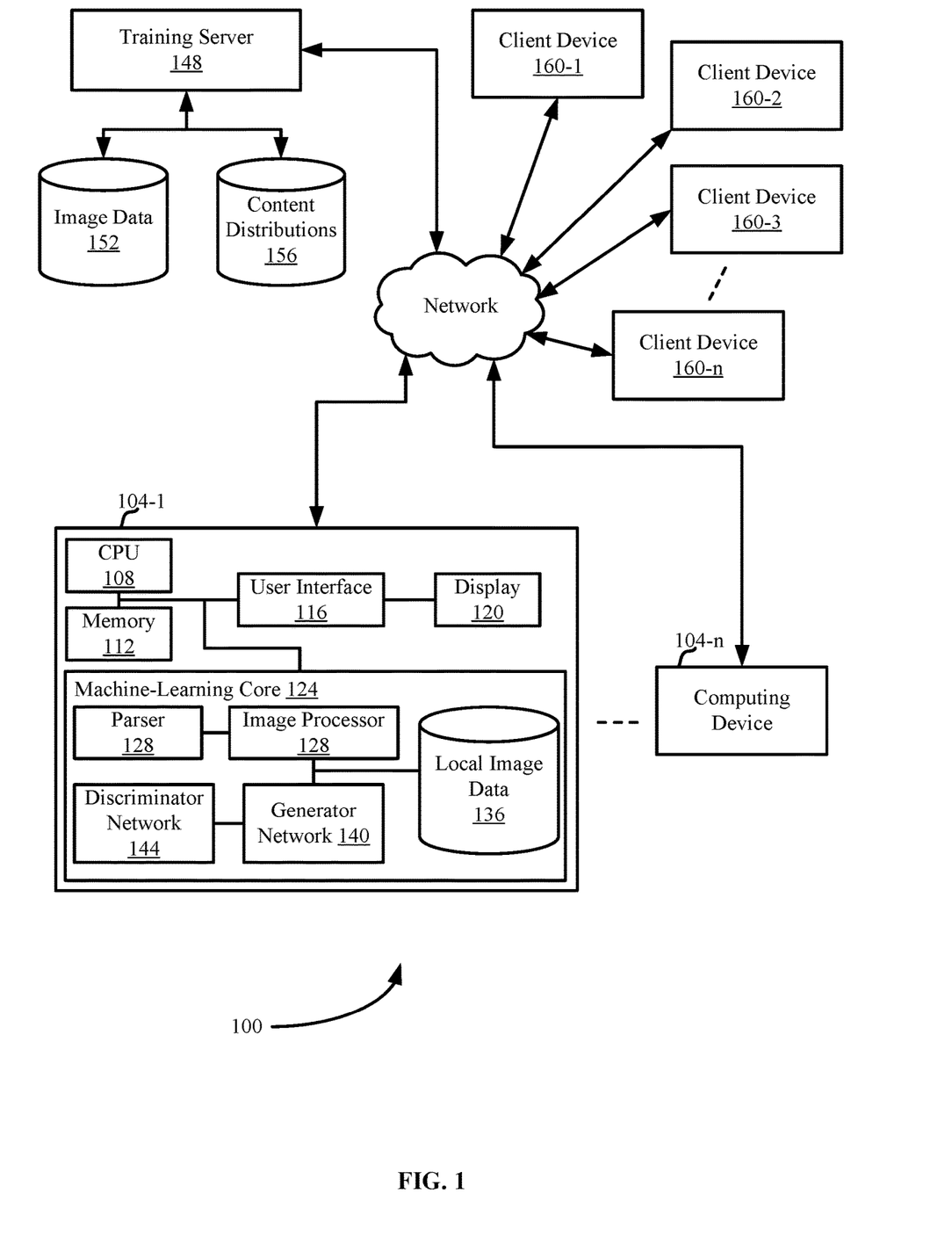
FIG. 1 is a block diagram of a scalable architecture for generation of content distribution images according to at least one aspect of the disclosure.

FIG. 1 is a block diagram of a system 100 for generation of content distribution images according to at least one aspect of the disclosure. System 100 includes one or more computing devices 104-1, 104-*n*, that may be used for automatically generating content for content-distribution operations. Each computing device 104-1 through 104-*n* may include the same hardware components such as those depicted within 104-1 or different hardware components. For instance, computing device 104-1 may be include hardware components to perform a particular aspect of the content generation (e.g., textual analysis, image processing, content generation, content evaluation, combinations thereof, or the like).

Computing device 104-1 includes one or more processors (e.g., CPU 108), coupled to memory 112 via a bus. User interface 116 may presented on display 120 for interacting with a user. The user may operate an Input/Output device to define a new content-distribution operation within the user interface 116. The input may include one or more attributes and text that characterizes the new content distribution. For instance, the text may be natural language text, alphanumeric strings, alphanumeric commands, or the like.

The content-distribution operation definition may be passed to machine-learning core 124. Machine-learning core 124 may one or more artificial intelligence modules that each execute together to generate images that conform to the content-distribution operation definition. The definition may be passed to parser 128 within machine-learning core 124. Parser 128 may breakdown the textual input to determine one or more keywords of the definition. The one or more keywords may correspond to a context of the definition such as a subject, object, etc. of the content to be distributed. Parser 124 converts the text into a set of tokens (e.g., each alphanumeric character, each word, and/or phrase based on the settings of parser 124). The set of tokens may then be labeled individually and combination (e.g., using a sliding window of a preset character length). The labeling may be based on matching a token to a pre-defined keyword, a hierarchy of rules, or using machine-learning. The machine-learning implementation may output only those tokens that can be associated with a context (e.g., nouns, verbs, adjectives with a noun, etc.) while ignoring or discarding particular tokens such as those associated with articles or the like (e.g., words that have little contextual value).

Machine-learning core 124 may use the one or more extracted keywords obtain image data. In some instances, machine-learning core 124 may retrieve the image data that corresponds to the one or more keywords from local image data 136. In other instances, machine-learning core 124 may generate and execute a query to an external data store such as computing device 104-*n* or image data 152. If the data cannot be sourced within the network, machine-learning core 124 may generate and execute a query to retrieve the image data from the Internet (e.g., using search engine, a web-crawler, etc.). The image data may include one or more images that depict subjects/objects that correspond to one or more of the one or more keywords (i.e., the context or a portion thereof). For instance, the one or more keywords can include "racetrack" and "sedan" and the image data may include images of racetracks, images of sedans, and/or images that include both sedans and racetracks.

Machine-learning core 124 may pass the image data to image processor 128 to process the images into a format more suitable for one or more neural networks such as a generative adversarial network. Image processing may include one or more operations that modify the image and/or label the contents of the image. Image processing can include applying one or more filters, signal or frequency analysis, edge detection, orientation correction such as an affine or Euclidean transformation, combinations thereof, or the like.

For instance, edge detection modify an image to emphasis the edges of objects (or subjects) within the image. Edge detection can be initiated with a filtering technique in which one or more filters can be applied to the image. Filters may modify the image by, blurring, sharpening, transforming (such as, but not limited to one or more affine transformations, Euclidean transformations, or the like), and/or the like. Filters may reduce image noise by, for example, removing image artifacts and/or other portions of the image that do not correspond the one or more keywords.

In some instances, an image may have some portions that may be processed more than other portions of the image. For instance, a portion of the image to appear blurry and another portion of the image may be clear. Different filters may be applied to different portions of the image, and in addition, a different set of filters may be applied to different portions of the image. Different filters may be applied to different portions of the image. For example, a first portion of the image may be filtered to sharpen the first portion and a second portion of the image may be filtered with an affine transformation filter and noise reduction. Any number of different filters may be applied to the image and/or each patch.

Once the filters are applied, variations in pixel intensity gradients across adjacent pixels can be identified. Large variations in the intensity between adjacent pixels can be indicative of the presence of an edge. For example, a first pixel with a high intensity value next to pixels with a low intensity values can provide an indication that the first pixel is part of an edge. In some instances, pixels that are not part of edges may be suppressed (e.g., set to a predetermined red/green/blue value, such as black, where red=0, blue=0, and green=0, or any predetermined red/green/blue value). An edge detection operator such as a Roberts cross operator, a Prewitt operator, a Sobel operator, and/or the like may be used as part of the identification of the pixel intensity gradients.

A non-maximum suppression process may be used to suppresses pixels that do not correspond strongly to an edge. The non-maximum suppression process assigns an edge strength value to each pixel identified using the pixel intensity gradient as being part of an edge. For each pixel identified as being part of an edge, the pixel's edge strength value can be compared to the edge strength value of the pixel's s eight surrounding pixels. If the pixel has a higher edge strength value than the edge strength value of the surrounding pixels (e.g., local maxima), then the surrounding pixels are suppressed. Non-maximum suppression may be repeated for each pixel in the entire image.

A double threshold process may then be execute to remove noise and/or spurious edge pixels that carried through application of previous image processing techniques applied herein. Two thresholds of pixel intensities may be defined, one high and one low. The thresholds may be used to assign an intensity property to each pixel as being strong or weak. Pixels that include an intensity value higher than the high threshold can be assigned a strong intensity property, where pixels that include an intensity value that is between the high threshold and the low threshold can be assigned a weak intensity property. Pixels that include an intensity value below the low threshold may be suppressed (e.g., in the same manner as described above).

A hysteresis process may then be executed to remove pixels with a weak intensity property (that is weak due to noise, color variation, etc.). For example, a local statistical analysis (e.g., a connected-component analysis, etc.) may be performed for each pixel with a weak intensity property. Pixels with a weak intensity property that are not surrounded by a pixel that includes a strong intensity property may be suppressed. The remaining pixels (e.g., the un-suppressed pixels) after the hysteresis process include only those pixels that are part of edges. Although the above five processing processes were described in a particular order, each process may be executed any number of times (e.g., repeated), and/or executed in any order without departing from the spirit or the scope of the present disclosure. In some instances, only a subset of the five processes need be performed on the image. For example, image processing may perform identification of the pixel intensity gradients process without first performing a filtering process. In some instances, images may be received partially processed (e.g., one or more of the processes above having already been performed). In those instances, one or more additional processes may be performed to complete the image processing.

In some instances, signal processing may performed on the image (e.g., similar to a radio frequency signal). The image may be transformed into a frequency domain (e.g., using a Fourier transform or the like) to represent the frequency in which a particular pixel characteristic exists in the image (e.g., pixel intensities, RGB values, and/or the like). In the frequency domain, one or more filters (such as, but not limited to, Butterworth filters, band pass, and/or the like) may be applied to the image (e.g., during preprocessing, edge detection, or after) to suppress or alter particular frequencies. Suppressing particular frequencies can reduce noise, eliminate image artifacts, suppress non-edge pixels, eliminate pixels of particular colors or color gradients, normalize color gradients, and/or the like. A high-pass filter may reveal edges in an image (e.g., sharp contrasts of color and/or intensity between adjacent pixels) while a low-pass filer may blend edges (e.g., blur). Image padding may be performed prior to signal processing to improve the signal processing techniques. In some instances, different portions and/or patches of the image may be processed differently with some being processed with a high-pass filter and others with a low-pass filter. In some instances, the thresholds (e.g., the cutoff frequency for the high or low-pass filters) may be modified for different portions of the image (e.g., based on image processing one or more previous images, machine-learning, and/or the like).

Signal processing may also determine other properties of the image such as coherence (e.g., used in edge detection, segmentation, pattern analysis, etc.), which identifies the relation between pixels. The relation between pixels can be used to further refine edge detection and/or to identify the structural properties of what is depicted within the image. For example, coherence can be used to identify portions of the image that are related (e.g., portions of a same object corresponding to a keyword) from parts of the image that are not.

In some instances, image segmentation operations may be executed in place of, during, or after edge detection. Image segmentation assigns a coherence value (e.g., a described above) to each pixel of the image. Image segmentation may use the coherence value identified during the edge detection or one or more other operations such as Sobel model, graph partitioning, etc. The coherence value represents a label of the pixel that can be used to group pixels according to common labels (e.g., objects depicted in the image). The coherence value may be used to identify the location, orientation, and shape of an object within the image, which can be used via a lookup table to identify the object. If the object cannot identified using the coherence and image characteristics, the processed image (pending further image processing) may be passed to a classifier.

The classifier may be a predictive machine-learning model such as, but not limited to, a neural network or the like. The classifier may be trained to label objects/subjects corresponding to the one or more keywords. The classifier can be trained using local image data 136 or from one or more training datasets received from training server 148. The neural network may be trained using supervised or unsupervised learning. For instance, in supervised learning, a set of labeled images may be input into the neural network. The neural network may define a feature set (e.g., a set of image characteristics that indicate the presence of the label). The feature sets may be used by the classifier when non-labeled data is input to the neural network. In unsupervised learning, images may be passed as input to the classifier with labels. The classifier may learn feature sets through analysis of the images. If the accuracy of the classifier falls below a threshold value, the classifier may be re-trained using supervised or unsupervised learning using the training dataset and/or any additional labeled or un labeled images.

In some instances, it may be determined whether the generative adversarial network is trained to generate images that correspond to the image data prior to passing the image data as input. If the generative adversely network has not been trained, then machine-learning core 124 may train the generative adversarial network on demand based on the particular processed image and/or labeled image data that may be passed as input. For instance, if the image data corresponds to racetracks and sedans and the generative adversarial network was not trained using images of racetracks and/or sedans, the generative adversarial network may be unable to generate images that appear as real images (e.g., that do not appear as if computer generated).

Machine-learning core 124 may attempt to locate and build a training dataset in local image data 136. If none can be found, machine-learning core 124 may generate and execute a query to training server 148. Training server 148 may use image data 152 or image data from previous content-distribution operations 156 to obtain images to train the generative adversarial network. For instance, if a company previously executed content-distribution operations associated with racetracks and sedans, machine-learning core 124 may access the training data and/or the generated images from that content distribution campaign to train the generative adversarial network.

In some instances, a plurality of generative adversarial networks may be provided with each generative adversarial network trained to generate images corresponding to a particular one or more keywords. For instance, the image data (e.g., input data) may be categorized by the classifier to determine a type of image that is to be generated (e.g., a particular subject, object, setting, etc.). A particular generative adversarial network of the plurality of generative adversarial networks may be selected based on the particular generative adversarial network having been trained to generate images that corresponded to the category identified by the classifier. The plurality of generative adversarial networks may be organized in a hierarchy based on the specificity of the keywords on which each generative adversarial network is trained.

The generative adversarial network includes a generator neural network 140 and a discriminator neural network 144 that operate in a feedforward and backwards propagation learning pattern after training. Generator network 140 uses a one or more layers of transform/weight functions to identify features of the training images that correspond to particular characteristics (e.g., background, foreground, keyword, object, subject etc.). During supervised-learning the features may be compared to labels of the image to determine the accuracy of generator network 140. Training may continue until a threshold accuracy has been reached. Generative network 140 may be retrained if the accuracy falls below the threshold value. Once trained, generator network 140 may be used to generate a series of images that correspond to the input one or more keywords. The generator network 140 attempts to generate images that appear indistinguishable from a real image (or close thereto).

Once generator neural network 140 is trained, discriminator neural network 144 may be trained. The discriminator network 144 attempts to predict whether the images were generated by generator neural network 140 (e.g., fake images). During training, a training set of images generated by the generator neural network 140 and images received from one or more other sources may be input to discriminator network 144. The training data may be labeled (for supervised learning) or unlabeled (for unsupervised learning). Discriminator network 144 may use the images passed as input to improve the accuracy of subsequent predictions. Once trained, discriminator network 144 may begin predicting the images generated by generator network 140. The predictions may be passed back to generator neural network 140 to improve the images generated. The process may continue until a predetermined error rate is detected. For instance, the error rate may correspond to a percentage of images that are generated by generator neural network 140 but predicted by discriminator neural network 144 as being real (e.g., discriminator neural network 144 predicted the images as having not been generated by generator neural network 140). Since the two networks operate with both feed forward and backwards propagation, the models continuously achieve more realistic images generated by generator network 140.

In some instances, discriminator network 144 may output other characteristics of the images in addition to the prediction. For instance, discriminator network 144 may assign a confidence value that indicates a level of confidence of the prediction. Discriminator network 144 may also assign an accuracy value that indicates how close the generated image corresponds to the one or more keywords. For instance, for keywords of "racetrack" and "sedan", if the generated image depicts a racetrack without a sedan it may be given a lower accuracy value than a generated image that depicts both a racetrack and a sedan. The images may be ranked according to accuracy (and/or prediction) to determine which generated images should be transmitted to client devices 160-1, 160-2, 160-3, . . . 160-n.

Once generator 140 generates images that fool discriminator neural network 144 (e.g., appear sufficiently realistic that discriminator neural network 144 predicts the images as being real) the images may be further processed (e.g., using one or more of the previously described image processing operations) and/or the images may be distributed over a network to one or more client devices 160-1, 160-2, 160-3, . . . 160-n.

Figure 2:
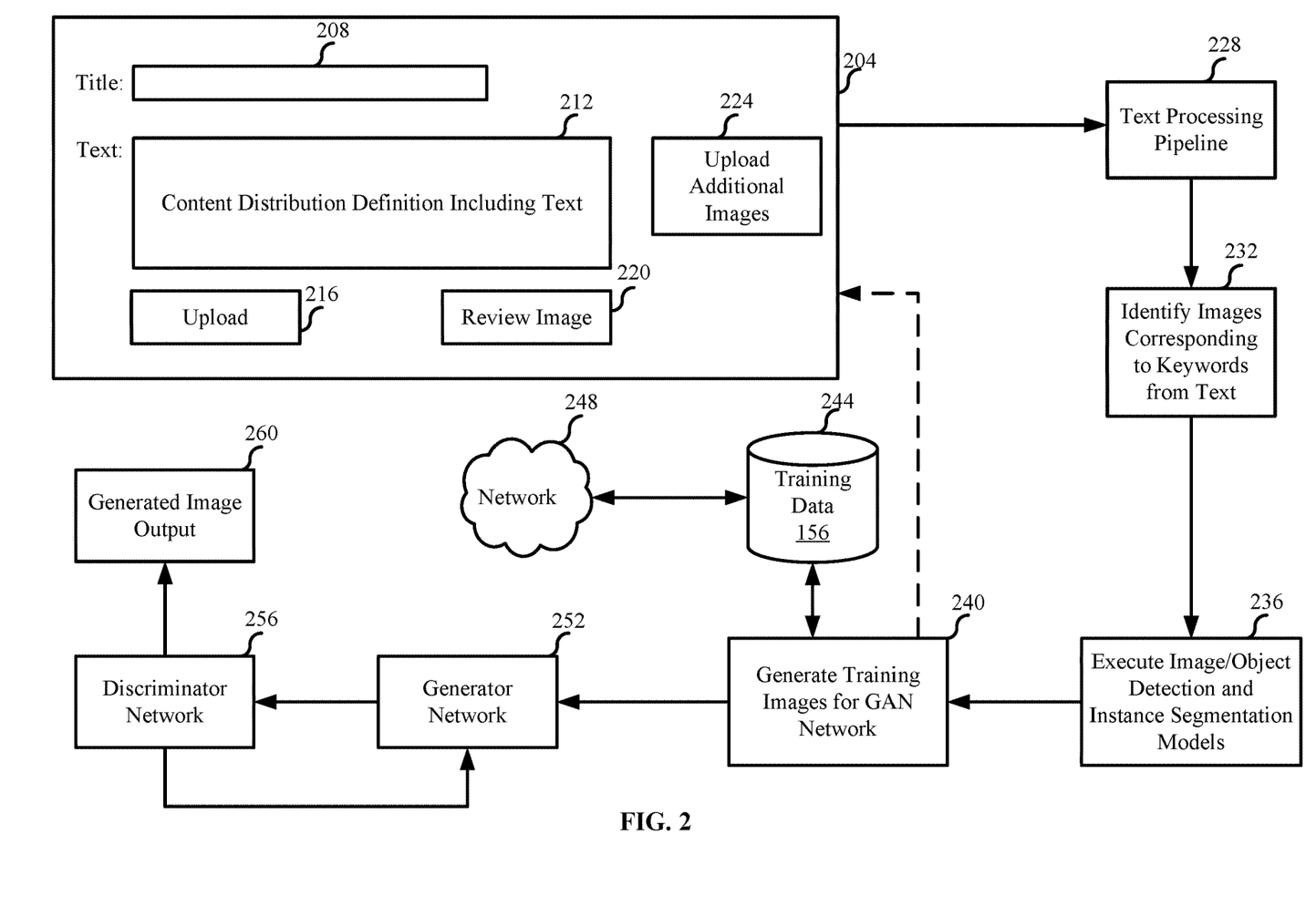
FIG. 2 is a block diagram illustrating the process flow for generating content distribution images according to at least one aspect of the disclosure.

FIG. 2 is a block diagram illustrating a process flow for generating content distribution images according to at least one aspect of the disclosure. The process flow may be initiated with user interface 204 that enables a user to define a content-distribution operation. User interface includes multiple fields for a content-distribution operations including a title field 208 and a text field 212. Text field 212 enables receipt of user input such as an alphanumeric string describing a content-distribution operation. Once received, an upload button 216 may be selected to transmit the alphanumeric strings entered in title 208 and text 212 to one or more machine-learning cores for content generation. In some instances, at least one machine-learning core may execute locally on the same device as user interface 204. In other instances, user interface 204 may be presented on a different device from the machine-learning cores. User interface 204 may include one or more additional fields that allow a user to indicate particular properties of the content-distribution operation including, but not limited, receiving devices (or users), one or more communication protocols to transmit content once generated, a threshold accuracy for each generated image, or the like.

The text (and any other properties) may be passed to text processing pipeline 228 that may parse the text to determine one or more keywords that are associated with the text field 212. The text may be parsed via a keyword lookup table, a machine-learning model, or any other operations as described above. At block 232, the one or more keywords identified from text field 212 at text processing pipeline 228 may be used to identify image data that corresponds to the one or more keywords. For example, block 232 identifies images or a portion of images that correspond to each of the one or more keywords. In some instances, a predefined quantity of images for the image data may be defined. In those instances, block 232 may first identify a first set of images that correspond to each of the one or more keywords. If the first set of images is not equal to or greater than a predefined threshold, then images that correspond to all but one of the one or more keywords may be added to the first set of images. If the first set of images is still not equal to or greater than the predefined threshold, then images that correspond to all but one of the one or more keywords may be added to the first set of images and so on until a predefined quantity of images is obtained for the image data.

At block 236, one or more image processing techniques and/or object identification may be executed on the image data. For instance, the image data may be modified using image segmentation or edge detection to distinguish the portions of the image that correspond to at least one of the keywords from the portions of the images that do not correspond to the one or more keywords. The portions of each image that correspond to at least one keyword may be labeled with the at least one keyword. In some instances, further image processing may be executed to remove portions of the image (or otherwise mark those portions) that do not correspond to at least one keyword.

The labeled and processed image data may be passed to block 240, which may use the labeled and processed image data to generate training datasets for generative adversarial network 252-256. For instance, block 240 may determine whether generative adversarial network 252-256 is trained to generate images that correspond to the one or more keywords. If not, training datasets corresponding to the one or more keywords may be generated to dynamically train generative adversarial network 252-256. For instance, the training datasets may be obtained from training server 148, which may access image data from previous content distributions 156 and/or one or more remote networks (e.g., external networks, the Internet, etc.).

In some instances, the images from the labeled and processed image data may be output to user interface 204. For example, a representation of some or all of the labeled and processed image data may be transmitted to user interface 204. The user may then review images from the labeled and processed image data. In some instances, the user may discard one or more images from the labeled and processed image data (e.g., those in which do not pass user review). In some instances, the user may supplement the labeled and processed image data by, for example, uploading additional images 224 into the labeled and processed image data.

The labeled and processed image data may be passed as input into a generative adversarial network that includes generator network 252 and discriminator network 256. Generator network 252 may use the labeled and processed image data to generate a set of new artificial images that can be evaluated by discriminator network 256. Discriminator network 256 may generate a predication that that indicates whether the generated images are real or artificial. The images that are predicted to be real may be output to block 260, where the images are packaged for transmission to one or more remote clients or client devices. The images that are predicted to be artificial may be passed back to the generator network 252 as backpropagation in the generative adversarial network to improve the accuracy of future image generation and subsequent labeling.

Figure 3:
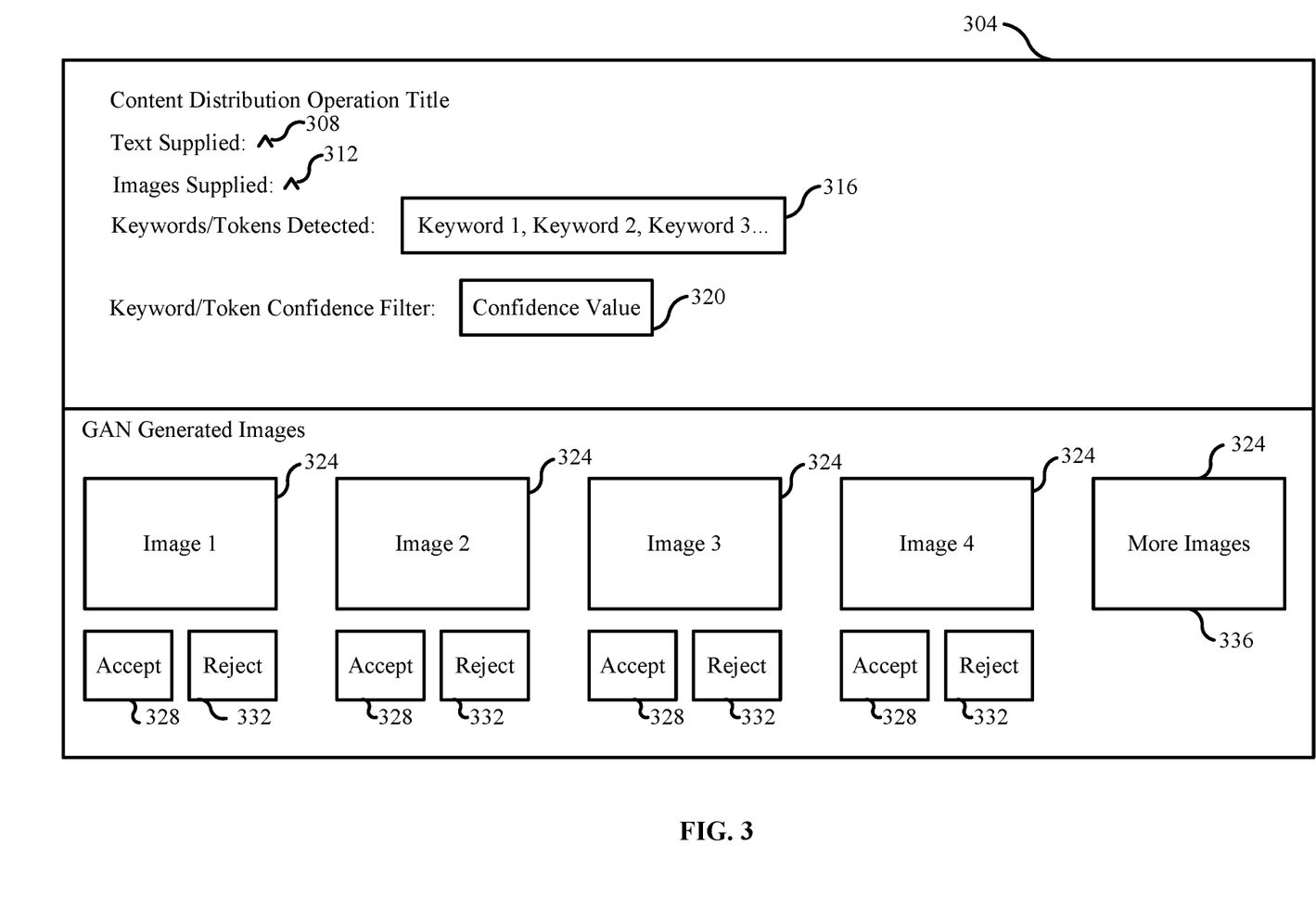
FIG. 3 illustrates an example of a graphical user interface associated with generating content distribution images according to at least one aspect of the disclosure.

FIG. 3 illustrates an example of a graphical user interface associated with generating content distribution images according to at least one aspect of the disclosure. Graphical user interface 304 includes one or more frames with each frame presenting different information to a user. For instance, the upper frame may receive user input that defines and/or modifies aspects of a content-distribution operation. After text defining the content-distribution operation is parsed into one or more keywords that represent the context of the content-distribution operation, the user may be presented with user interface 304 to modify aspects of the content-distribution operation definition. For instance, the user can toggle operator 308 to display the text defining the content-distribution operation.

The user can toggle operator 312 to review some or all of the reference images supplied to the machine-learning cores generating the images. The reference images include images supplied by the user and/or images from the image data identified by the machine-learning cores. Keywords/Tokens detected 316 may include a representation of each keyword and/or relevant token identified from the text supplied. The user may select or deselect one or more keywords to generate new image data or modify the image data (if already generated). Keyword/token confidence filter 320 may be used to indicate to the user which keywords are likely to correspond highly to the text supplied and which keywords may have a low confidence of correspondence. In some instances, keyword/token confidence filter 320 can include one or more threshold filters that automatically removes keywords that fall below a particular confidence value.

The images generated by the generative adversarial network may be presented in real-time (e.g., as the images are generated) via user interface 304. User interface 304 may represent each generated image 324 as a full image or as a thumbnail image that upon receiving input selecting the image, may be presented as a full image. In some instances, the image presented via user interface 304 may be all the images generated by the generative adversarial network. In other instances, the image presented via user interface 304 may include only those images that were predicted by the discriminator network as having not been generated by the generator network. Each image 324 can include an accept button 328 and a reject button 332. Input may be received to accept 234 the image for distribution to one or more clients or client devices or reject 324 the image thereby discarding the image. In some instances, the selection of the accept 328 or reject 332 may be assigned as a label to the image 324. The images and the assigned labels may be back propagated to the generative adversarial network to add an additional layer of training that may further improve image generation for content-distribution operations.

Figure 4:
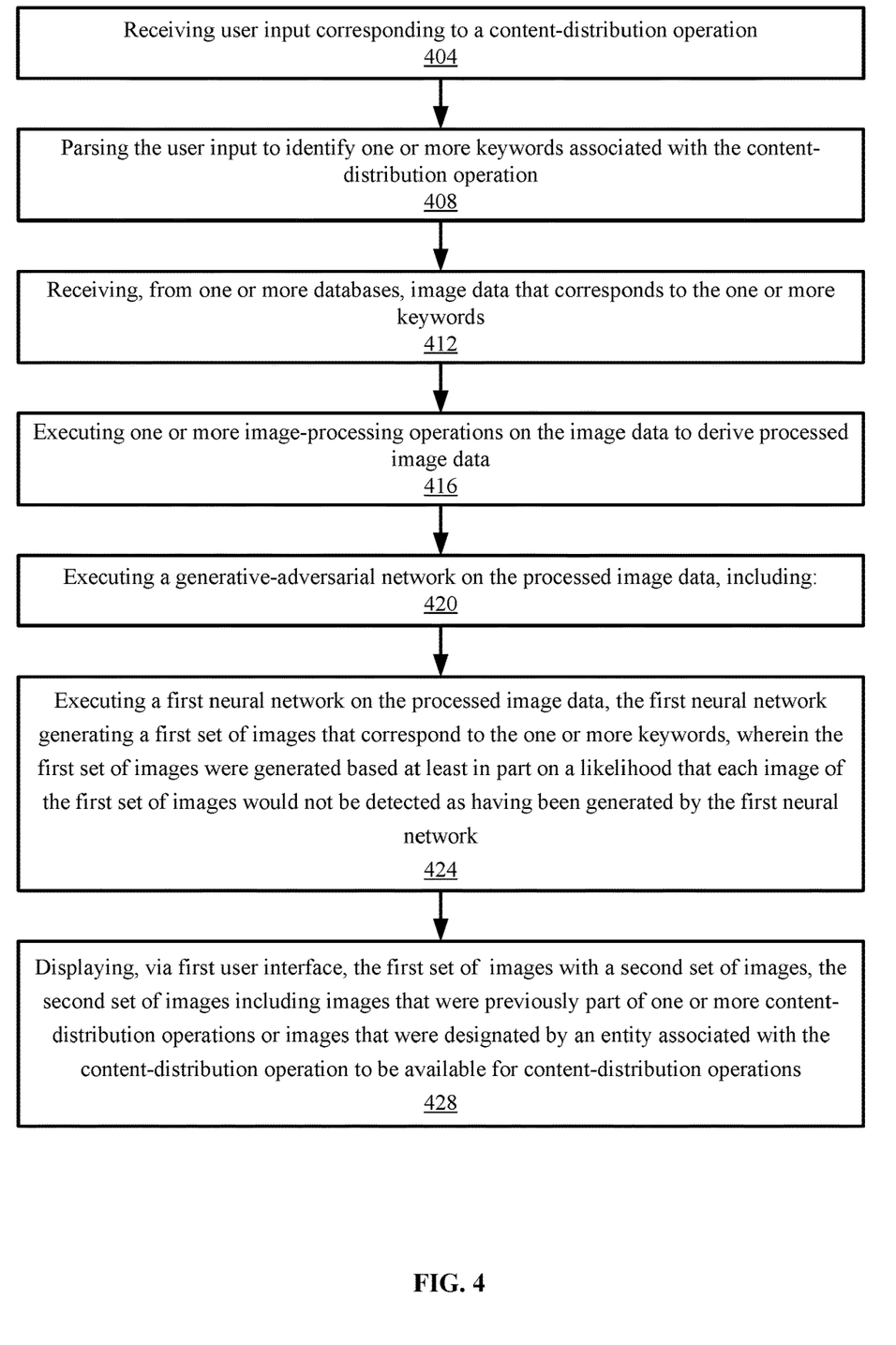
FIG. 4 illustrates an flowchart for generating content-distribution operations according to at least one aspect of the disclosure.

FIG. 4 illustrates an flowchart for generating content-distribution operations according to at least one aspect of the disclosure. At block 404, user input may be received to generate content for a content-distribution (e.g., marketing) operation associated with an entity (e.g., a company selling a product/service or a company offering content distribution services). The user input may include one or more alphanumeric strings that describes the content-distribution operation. The one or more alphanumeric strings can include natural language text, text commands in a particular schema such as in key/value pairs, or the like. The user input may also include one or more properties of content-distribution operation such as types of images to generate, format of the images, the clients or client devices to receive the images, communication protocols to be used in transmitting the images, combinations thereof, or the like.

At block 408, the user input may be parsed to identify one or more keywords associated with a context of the content-distribution operation. The parsing the user input can include one keyword analysis (e.g., identifying particular words and matching them to a keyword lookup table), a natural-language machine-learning model (as described above), or the like. Each keyword of the one or more keywords indicates a portion content to be depicted in the generated images. For instance, a keyword may correspond to an object, context, action, subject, background, foreground, setting (e.g., location such as a beach or a school), combinations thereof, or the like.

At block 412, image data corresponding to at least one of the one or more keywords may be received from one or more databases (or networks such as an external network or the Internet). In some instances, the image data may include structured or unstructured data that characterizes or represents images that are associated with at least one keyword. In other instances, the image data includes one or more images that each correspond to at least one keyword in addition to the structured or unstructured data. In still yet other instances, the image data may only include the one or more images.

At block 416, one or more image processing operations may be executed on the image data to derive processed image data. The one or more image processing operations include operations that may modify or transform the image (e.g., affine transformations, edge detection, image segmentation, etc.). The one or more image processing operations may also include object detection. Object detection may use a trained neural network to identify one or more objects, subjects, settings, actions, contexts, combinations thereof, or the like in the image. For instance, for an image of a sedan racing on a racetrack, the trained neural network, may label the portion of the image that corresponds to the object (e.g., the sedan), the portion of the image corresponding to the setting (e.g., racetrack), a context may be labeled (e.g., such day/night, weather, etc.). The one or more image processing operations may also include removing portions of the image that do not correspond to at least one keyword.

The one or more image processing operations may also include marking a portion of a particular image of the image data that is to remain unmodified by the generative adversarial network that is to generate images similar to the particular image. For instance, an object may be marked as to remain unmodified such that when input into a generative adversarial network, the generative adversarial network may generate different images that include the same the object. The generative adversarial network may generate images of the object in different contexts (e.g., different settings, locations, backgrounds, foregrounds, weather, or the like) with different other objects, etc.

The one or more image processing operations may also include marking a portion of a particular image of the image data that is to be modified by the generative adversarial network. For instance, an object may be marked as to be unmodified such that when input into a generative adversarial network, the generative adversarial network may generate different images with the only difference being the object. If the object is a sedan that is depicted on a racetrack, marking the sedan in this manner can enable the generative adversarial network to generate images with the only difference being modifications to the sedan. For instance, the generative adversarial network may generate images with the sedan being a different color or being of a different make or model. The sedan may be replaced with a different object such as a truck, a bicycle, etc. If the object corresponds to a human, the human a characteristic of the human can be modified such as, but not limited to, the age, race, gender, height, weight, appearance (e.g., eye color, hair color, clothing, or the like), combinations thereof, or the like.

At block 420, a generative adversarial network can be executed on the processed image data, including:

At block 424, a first neural network may be executed on the image data to generate a first set new images that each correspond to at least one keyword of the one or more keywords. In first neural network may be executed using the one or more keywords as input (from the processed image data) or using one or more images. The first set of images may be synthetic images that are entirely computer generated, but are generated so as to appear as if the image was real (e.g., not computer generated). The first neural network may be a generator neural network as part of a generative-adversarial network. The generator neural network may be trained using a second neural network such that the first set of images may be generated based on a likelihood that each image of the first set of images would not be detected by the second neural network as having been generated by the first neural network.

For instance. the second neural network may generate a prediction for each ancestor image (e.g., images previously generated by the first neural network) of a training set of images. The prediction may correspond to a likelihood that the ancestor image was generated by the first neural network or not. The training set of images can include the ancestor images and images received from one or more other sources (e.g., previous content-distribution operations, the Internet, images from the same entity, etc.). The one or more other sources can include the image data, one or more images received from a local or remote database, the Internet, etc. The images received from the one or more other sources may be real images (e.g., images not generated by a computer, images generated by a computer such as another generative adversarial network, or a combination thereof.

The second neural network may be a discriminator neural network representing the other portion of the generative-adversarial network. The goal of the generative adversarial network may be to generate images that appear to be real images, which trick the second neural network into predicting that the generated images are "real" images rather than images generated by the generator neural network. The goal of the second neural network is to correctly predict whether images were generated by the first neural network and pass that prediction back to the generator neural network (e.g., backwards propagation learning). In some instances, the second neural network may assign a range of values rather than a Boolean (e.g., real or generated by the generator neural network). For instance, the range of values may indicate a probability or confidence that an image was generated by the generator neural network. In some instances the first neural network and the second neural network may be the same neural network, while in other instances, the first neural network and the second neural network may be different neural networks.

The first neural network may be updated using the prediction of the second neural network. The prediction assigned to images generated by the first neural network may provide an indication to the first neural network as to how well the images tricked the second neural network into predicting that the images were or were not generated by the first neural network. This information can be used to modify one or more layers of the first neural network such that the first neural network can produce images that second neural network is more likely to predict as being real images (e.g., more likely to appear like realistic images rather than computer generated images).

Once trained, the first neural network may be executed to generate images each of which corresponding to at least one keyword of the one or more keywords. The first neural network may be continually trained using the generated images to continually improve subsequently generated images (e.g., such that the images are less likely to appear as if generated by a computer).

At block 428, a user interface may display the first set of images with a second set of images (e.g., side by side, within a same window, or the like). The second set of images may include images that were previously part of one or more content-distribution operations or images that were designated by an entity (e.g., the company, user within the company, etc.) as being associated with the one or more keywords. In some instances, the first set of images may be transmitted to clients or client devices (e.g., based on the user input of block 404). The user interface can enable a user to review each image of the first set of images and compare those images with the images of the second set of images. In some instance, the user may accept or reject individual images of the first set of images. In those instances, the user's selection to accept or reject may be assigned as a label to the image. The images and corresponding labels may be passed to the first neural network for further training of the first neural network. In some instances, images that were labeled as being real may be removed prior to the further training. This may enable a second layer of back propagation learning in the generative adversarial network in which the second neural network and the user can each separately further update or train the first neural network.

Each block of FIG. 4 may be executed in any particular order or with any particular frequency such as for example, in order, out of order, once, or multiple times (either in order or out of order) without departing from the spirit or scope of the present disclosure.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
   receiving user textual input corresponding to a content-distribution operation;
   parsing the user textual input to identify one or more keywords associated with the content-distribution operation;
   querying one or more databases for one or more images that correspond to the one or more keywords;
   executing one or more image-processing operations on the one or more images to derive processed image data that includes one or more image segments of the one or more images, wherein each of at least one of the one or more image segments corresponds to a keyword of the one or more keywords;
   executing a generative adversarial network on the processed image data to generate one or more images for the content-distribution operation, wherein executing the generative adversarial network includes:
      executing a first neural network on the processed image data, the first neural network generating a first set of images that correspond to the one or more keywords, wherein the first set of images were generated based at least in part on a likelihood that each image of the first set of images would not be detected as having been generated by the first neural network; and
   displaying, via a first user interface, the first set of images with a second set of images, the second set of images including images that were previously part of one or more content-distribution operations or images that were designated by an entity associated with the content-distribution operation to be available for content-distribution operations.

2. The method of claim 1, wherein the generative adversarial network is trained at runtime based on the one or more keywords.

3. The method of claim 1, further comprising:
   determining, based on the one or more keywords, that the generative adversarial network is not trained to generate new images that correspond to at least one keyword of the one or more keywords;
   transmitting, to one or more databases, a request for a training dataset, the training dataset including a plurality of images, wherein a portion of each image of the plurality of images corresponds to at least one keyword of the one or more keywords; and
   training the generative adversarial network using the training dataset.

4. The method of claim 1, wherein the image data includes one or more images from previous content-distribution operations.

5. The method of claim 1, wherein the one or more image-processing operations include labeling portions of each image of the image data that corresponds to a keyword of the one or more keywords.

6. The method of claim 1, wherein executing a generative adversarial network further includes:
   receiving input assigning a label of accepted or rejection to each image of the first set of images;
   training, the first neural network, based at least in part on the label; and
   removing from the first set of images, each image assigned a label of rejected.

7. A system comprising:
   one or more processors; and
   a non-transitory computer-readable medium including instructions that when executed by the one or more processors, cause the one or more processors to perform operations including:
      receiving user textual input corresponding to a content-distribution operation;
      parsing the user textual input to identify one or more keywords associated with the content-distribution operation;
      querying one or more databases for one or more images that correspond to the one or more keywords;

executing one or more image-processing operations on the one or more images to derive processed image data that includes one or more image segments of the one or more images, wherein each of at least one of the one or more image segments corresponds to a keyword of the one or more keywords;

executing a generative adversarial network on the processed image data to generate one or more images for the content-distribution operation, wherein executing the generative adversarial network includes:

executing a first neural network on the processed image data, the first neural network generating a first set of images that correspond to the one or more keywords, wherein the first set of images were generated based at least in part on a likelihood that each image of the first set of images would not be detected as having been generated by the first neural network; and displaying, via a first user interface, the first set of images with a second set of images, the second set of images including images that were previously part of one or more content-distribution operations or images that were designated by an entity associated with the content-distribution operation to be available for content-distribution operations.

8. The system of claim 7, wherein the generative adversarial network is trained at runtime based on the one or more keywords.

9. The system of claim 7, further comprising:
determining, based on the one or more keywords, that the generative adversarial network is not trained to generate new images that correspond to at least one keyword of the one or more keywords;
transmitting, to one or more databases, a request for a training dataset, the training dataset including a plurality of images, wherein a portion of each image of the plurality of images corresponds to at least one keyword of the one or more keywords; and
training the generative adversarial network using the training dataset.

10. The system of claim 7, wherein the image data includes one or more images from previous content-distribution operations.

11. The system of claim 7, wherein the one or more image-processing operations include labeling portions of each image of the image data that corresponds to a keyword of the one or more keywords.

12. The system of claim 7, wherein executing a generative adversarial network further includes:
receiving input assigning a label of accepted or rejection to each image of the first set of images;
training, the first neural network, based at least in part on the label; and
removing from the first set of images, each image assigned a label of rejected.

13. A non-transitory computer-readable medium including instructions that when executed by one or more processors, cause the one or more processors to perform operations including:

receiving user textual input corresponding to a content-distribution operation;
parsing the user textual input to identify one or more keywords associated with the content-distribution operation;
querying one or more databases for one or more images that correspond to the one or more keywords;
executing one or more image-processing operations on the one or more images to derive processed image data that includes one or more image segments of the one or more images, wherein each of at least one of the one or more image segments corresponds to a keyword of the one or more keywords;
executing a generative adversarial network on the processed image data to generate one or more images for the content-distribution operation, wherein executing the generative adversarial network includes:
 executing a first neural network on the processed image data, the first neural network generating a first set of images that correspond to the one or more keywords, wherein the first set of images were generated based at least in part on a likelihood that each image of the first set of images would not be detected as having been generated by the first neural network; and
displaying, via a first user interface, the first set of images with a second set of images, the second set of images including images that were previously part of one or more content-distribution operations or images that were designated by an entity associated with the content-distribution operation to be available for content-distribution operations.

14. The non-transitory computer-readable medium of claim 13, wherein the generative adversarial network is trained at runtime based on the one or more keywords.

15. The non-transitory computer-readable medium of claim 13, further comprising:
determining, based on the one or more keywords, that the generative adversarial network is not trained to generate new images that correspond to at least one keyword of the one or more keywords;
transmitting, to one or more databases, a request for a training dataset, the training dataset including a plurality of images, wherein a portion of each image of the plurality of images corresponds to at least one keyword of the one or more keywords; and
training the generative adversarial network using the training dataset.

16. The non-transitory computer-readable medium of claim 13, wherein the one or more image-processing operations include labeling portions of each image of the image data that corresponds to a keyword of the one or more keywords.

17. The non-transitory computer-readable medium of claim 13, wherein executing a generative adversarial network further includes:
receiving input assigning a label of accepted or rejection to each image of the first set of images;
training, the first neural network, based at least in part on the label; and removing from the first set of images, each image assigned a label of rejected.

\* \* \* \* \*